United States Patent [19]

Kawashima et al.

[11] Patent Number: 5,518,408

[45] Date of Patent: May 21, 1996

[54] KARAOKE APPARATUS SOUNDING INSTRUMENTAL ACCOMPANIMENT AND BACK CHORUS

[75] Inventors: Takahiro Kawashima; Shuichi Matsumoto, both of Hamamatsu, Japan

[73] Assignee: Yamaha Corporation, Shizuoka, Japan

[21] Appl. No.: 222,475

[22] Filed: Apr. 1, 1994

[30] Foreign Application Priority Data

| Apr. 6, 1993 | [JP] | Japan | 5-103461 |
| Apr. 6, 1993 | [JP] | Japan | 5-103462 |
| Sep. 27, 1993 | [JP] | Japan | 5-262946 |

[51] Int. Cl.$^6$ .............................. G09B 5/00; G10H 1/36
[52] U.S. Cl. ..................... 434/307 A; 434/318; 84/609
[58] Field of Search .......................... 434/307 R, 307 A, 434/308, 309, 318, 365; 84/454, 477 R, 601, 609, 615, 625, 645; 369/32, 48, 50; 360/33.1, 77.21; 358/310, 335, 342; 348/478, 484, 571, 585, 738

[56] References Cited

U.S. PATENT DOCUMENTS

| 5,194,682 | 3/1993 | Okamura et al. | 434/307 A |
| 5,235,124 | 8/1993 | Okamura et al. | 84/631 X |
| 5,243,123 | 9/1993 | Chaya | 64/601 X |
| 5,247,126 | 9/1993 | Okamura et al. | 434/307 A |
| 5,250,747 | 10/1993 | Tsumura | 358/342 X |
| 5,286,907 | 2/1994 | Okamura et al. | 84/610 X |
| 5,294,746 | 3/1994 | Tsumura et al. | 434/307 A |

FOREIGN PATENT DOCUMENTS

| 58-207083 | 12/1983 | Japan . |
| 4128796 | 4/1992 | Japan . |
| 4321100 | 11/1992 | Japan . |

Primary Examiner—Joe Cheng
Attorney, Agent, or Firm—Loeb & Loeb

[57] ABSTRACT

A karaoke apparatus is comprised of a data supply, a tone generator, an ADPCM decoder and a pitch shifter for sounding a requested karaoke song containing an instrumental accompaniment and a back chorus. The data supply supplies an ADPCM data representative of a phrase back chorus and being compressed by a variable compression condition, and supplies a song data containing accompaniment information prescriptive of an instrumental accompaniment, additional information prescriptive of a common back chorus and decoding information indicative of the variable compression condition of the ADPCM data, and further supplies key information which determines a pitch shift of the karaoke song. The tone generator processes the accompaniment information and the additional information to generate a first audio signal effective to sound synthesized tones of the instrumental accompaniment and the common back chorus. The ADPCM decoder operates in synchronization with the tone generator to decode the ADPCM data according to the decoding information for reproducing a second audio signal effective to sound the phrase back chorus concurrently with the instrumental accompaniment. The pitch shifter processes the second audio signal according to the key information to carry out the pitch shift of the phrase back chorus.

11 Claims, 8 Drawing Sheets

KARAOKE APPARATUS SOUNDING INSTRUMENTAL ACCOMPANIMENT AND BACK CHORUS

BACKGROUND OF THE INVENTION

The present invention relates to a karaoke apparatus for sounding a requested karaoke song containing an instrumental accompaniment part and a back chorus part. More specifically, the present, invention relates to a data compression technology (i.e., high efficiency codic technology) of the back chorus part, a pitch shift technology of the back chorus part and a synthesis technology of the back chorus part, all of which are directed to savings of the karaoke song data volume.

A karaoke apparatus is constructed such as to produce an instrumental accompaniment part of a requested karaoke song, which is concurrently mixed with a live vocal part of the same song picked up by a microphone. The karaoke apparatus has become popular, and is installed not only in a bar and a club, but also in a specialized rental room called a "karaoke box" and a vehicle such as a tourist bus. The conventional karaoke apparatus is normally a playback type or a musical tone reproduction type composed of a record unit for recording audio information and associated video information of karaoke songs, an audio unit for reproducing the karaoke song find mixing a singing voice therewith, a video unit for displaying background pictures and lyric word characters along with the reproduction of the karaoke song and a control unit for controlling the record, audio and video units. Recently, another karaoke apparatus of a synthetic type or a musical tone generating type was developed, which contains a tone generator for synthesizing musical tones according to a song data prescriptive of the karaoke song. Generally, the synthetic karaoke apparatus is connected through a communication network to a host station for retrieving therefrom the song data.

The playback karaoke apparatus has the record unit which is a closed or isolated data source, hence the playback karaoke apparatus cannot respond to a request for a non-entry karaoke song which is not stored in the record unit. On the other hand, the synthetic karaoke apparatus can access a database of the host station to freely retrieve therefrom a desired song data in response to a singer's request. An ultimate type of the synthetic karaoke apparatus is solely dependent on the data telecommunication such that all the requested song data are supplied from the host station without exception. In order to save data communication cost and time required for repeated access to the host station upon every request, a semi-self-support type of the synthetic karaoke apparatus has a storage defining an open data source for stocking the song data supplied from the host station for re-use.

The karaoke apparatus may sound a karaoke song containing a back chorus (i.e., a background harmony by human voices) in addition to the instrumental accompaniment in order to enhance an amusement of the karaoke performance. The back chorus is generally classified into a general or common chorus and a specific or phrase chorus. The common chorus is composed of a rather simple sound like a combination of a short consonant and a prolonged vowel such as "WAAA-" and "RAAA-" which may be repeatedly added in the same song, or a train of simple voices such as "WAAWAAWAA-" or "WA, WA, WA,-" which may be used for different songs. On the other hand, the phrase chorus is composed of a particular phrase such as "NAGASAKI-WAAA" specific to a requested song. Generally, the back chorus requires a great data volume as compared to the instrumental accompaniment so that the total data volume of the karaoke song is considerably expanded if the back chorus is introduced. However, the total data volume of each karaoke song should be reduced as much as possible in the synthetic karaoke apparatus in order to save the telecommunication cost and time of the karaoke song data and to save a capacity of the data storage. The synthetic karaoke apparatus has an advantage over the playback karaoke apparatus in that the tone generator is installed to synthesize the instrumental accompaniment based on the concise song data. However, the addition of the back chorus may obviate the advantage of the synthetic karaoke apparatus.

SUMMARY OF THE INVENTION

In view of the above noted drawbacks of the prior art, a general object of the present invention is to save the data volume of the back chorus in the karaoke apparatus. A first specific object of the invention is to efficiently compress the data volume of the back chorus. A second specific object of the invention is to efficiently utilize an original back chorus data by internal modulation. A third specific object of the invention is to efficiently apply the tone synthesis to the back chorus part.

In the first aspect of the invention, a karaoke apparatus for sounding a requested karaoke song containing an instrumental accompaniment and a back chorus, comprises supply means for supplying a waveform data representative of a back chorus and being coded by a desired encoding condition, and for supplying a song data containing accompaniment information prescriptive of an instrumental accompaniment and decoding information indicative of the desired encoding condition of the coded waveform data, generating means for processing the accompaniment information to generate a first audio signal effective to sound the instrumental accompaniment, and reproducing means operative in synchronization with the generating means to decode the coded waveform data according to the decoding information for reproducing a second audio signal effective to sound the back chorus concurrently with the instrumental accompaniment.

In the second aspect of the invention, a karaoke apparatus for sounding a requested karaoke song containing an instrumental accompaniment and a back chorus, comprises supply means for supplying accompaniment information prescriptive of an instrumental accompaniment, supplying a waveform data digitally sampled to represent a back chorus, and supplying key information which determines a pitch shift of the karaoke song, generating means for processing the accompaniment information to generate a first audio signal effective to sound the instrumental accompaniment, reproducing means operative in synchronization with the generating means for processing the waveform data to reproduce a second audio signal effective to sound the back chorus concurrently with the instrumental accompaniment, and shifter means for processing the second audio signal according to the key information to thereby carry out the pitch shift of the back chorus.

In the third aspect of the invention, a karaoke apparatus for sounding a requested karaoke song containing an instrumental accompaniment and a common back chorus, comprises supply means for supplying a song data containing accompaniment information prescriptive of an instrumental accompaniment and a common back chorus, and generating means for synthesizing an audio signal representative of the instrumental accompaniment and the common back chorus in accordance with the song data supplied by the supply means.

According to the first aspect of the invention, the supply means such as a data storage connected to a host station supplies the digital waveform data of the back chorus compressively coded in the form of an ADPCM data by a desired encoding condition or compression condition, accompanied by the decoding information indicative of the encoding condition. The reproducing means in the form of an ADPCM decoder decodes the ADPCM data according to the decoding information so as to sound the back chorus. The encoding condition can be set differently for different karaoke songs according to contents or a length thereof. Otherwise, the encoding condition can be set variably for each phrase of the back chorus in relation to significancy thereof. Thus, the encoding condition can be optimized to reduce the back chorus data volume in practical manner.

According to the second aspect of the invention, the shifter means carries out the pitch shift of the back chorus according to the key information. In detail, the shifter means carries out a modulational pitch shift of a phrase contained in the back chorus according to the key information indicative of a modulation of the phrase during the course of the instrumental accompaniment. For example, a phrase "NAGASAKIII-" is repeatedly sounded in the karaoke song while a key of the phrase is successively modulated to thereby enable efficient, use of a single standard phrase waveform data. In addition, the back chorus may be entirely transposed according to the key information inputted in matching with a key of a singer.

According to the third aspect, of the invention, the common chorus composed of relatively simple sounds is treated as a kind of musical tones like the instrumental accompaniment. Thus, the supplied song data contains the additional information prescriptive of the common chorus in a concise form besides the accompaniment information. The generating means in the form of a tone generator processes the additional information to sound synthesized tones of the common chorus, thereby saving a waveform data volume.

DETAILED DESCRIPTION OF THE INVENTION

Figure 1:
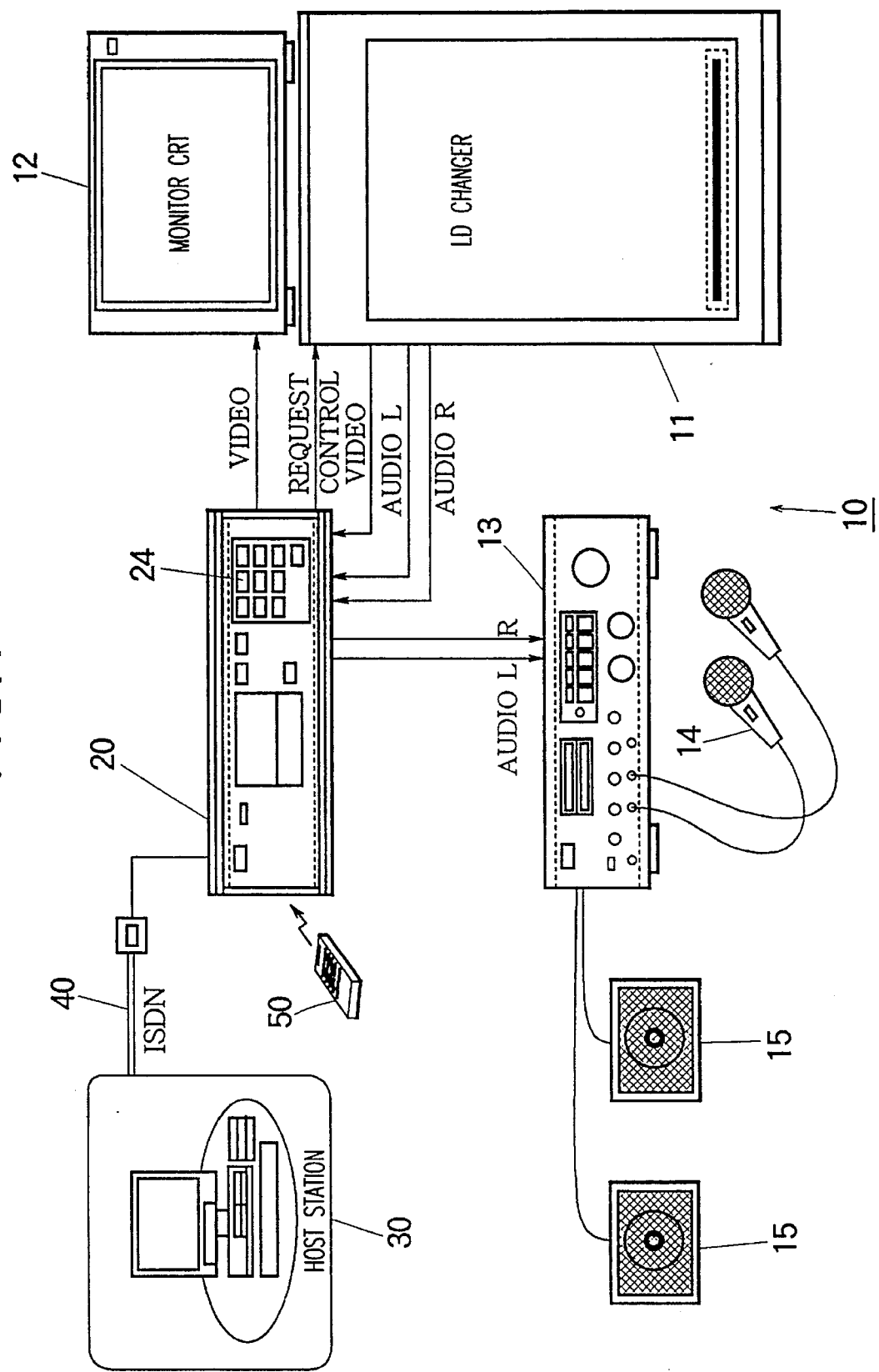
FIG. 1 is an overall block diagram showing an inventive karaoke system.

Hereinafter, embodiments of the invention will be described in conjunction with the drawings. FIG. 1 shows an overall construction of a karaoke system according to the present invention. The system includes a Laser Disc (LD) changer 11, a display in the form of a monitor CRT 12, a mixing amplifier 13, a microphone 14, and a pair of loudspeakers 15, those of which are connected altogether to constitute an ordinary karaoke apparatus 10 of the musical tone reproducing type or the playback type. The inventive system further includes a total control device 20 which contains a tone generating processor and which is connected to those of the monitor CRT 12 and the mixing amplifier 13 to functionally constitute another karaoke apparatus of the musical tone generating type or the synthetic type. This total control device 20 functions as a total system commander connected to a part of the playback type karaoke apparatus 10 so as to build and control the total karaoke system which is an integration of the playback karaoke and the synthetic karaoke. A remote host station 30 is connected to the total control device 20 through a fast digital communication network such as Integrated Services Digital Network (ISDN) to transmit thereto a requested song data. A remote controller 50 is provided to input a command such as a song request into the total karaoke system.

The playback karaoke apparatus 10 is a self-supporting type such that the LD changer 11 contains a great number of Laser Discs (LDs) as a closed data source. The Laser Disc records a number of karaoke songs and associated words and background pictures. The LD changer 11 is controlled by the request command to access and select the Laser Discs to output an audio signal AUDIO representative of the requested karaoke song to the mixing amplifier 13 as well as to output a video signal VIDEO representative of the associated words and pictures. The mixing amplifier 13 mixes a live voice of a singer picked up by the microphone 14, with an automatic accompaniment of the requested song. The loudspeaker 15 acoustically transmits the mixed sound of the voice and the accompaniment. Concurrently, the monitor CRT 12 displays the song words and the background pictures associated to the requested karaoke song to assist in the vocal performance of the singer.

Figure 2:
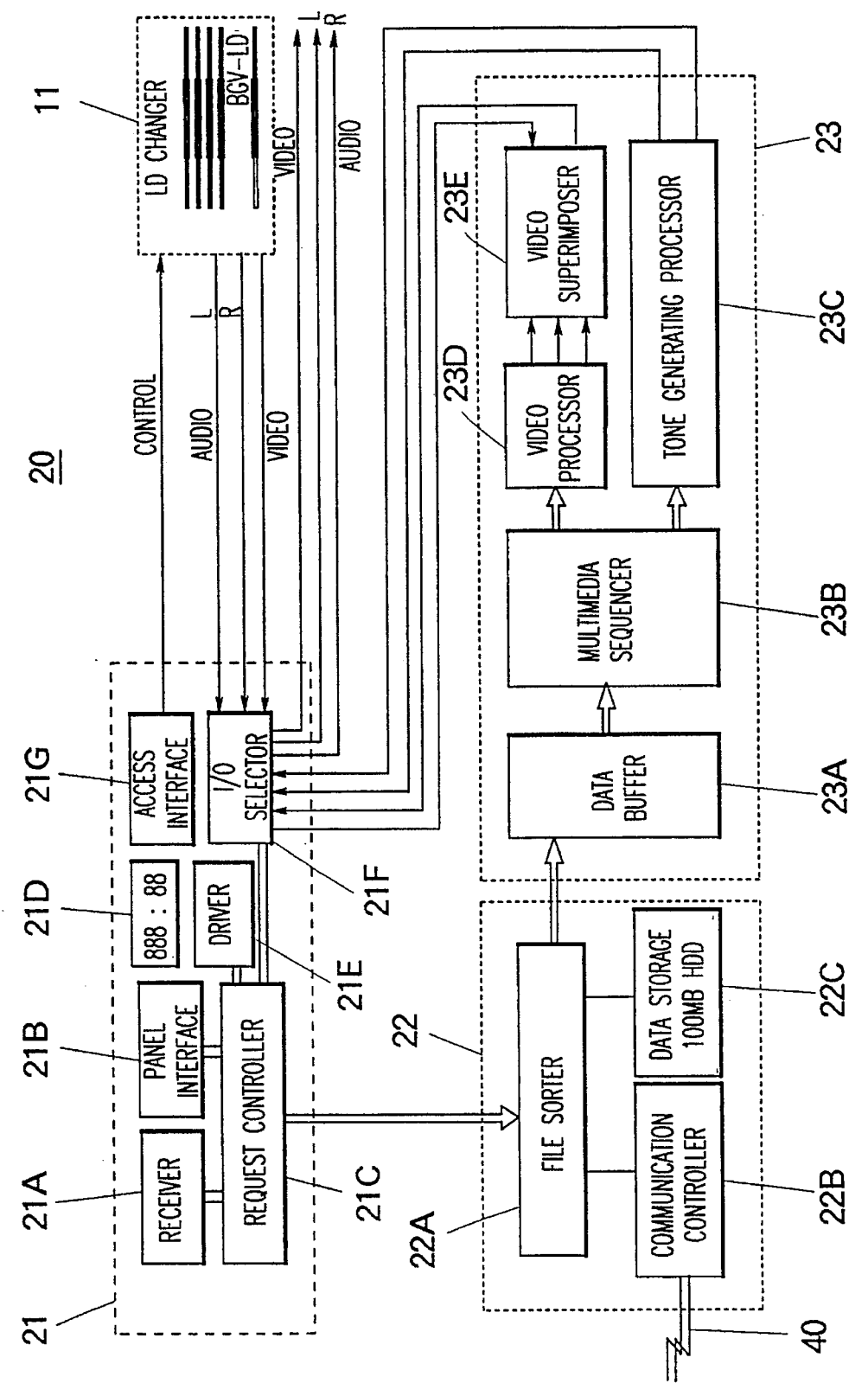
FIG. 2 is a block diagram of a total control device incorporated in the inventive karaoke system.

FIG. 2 is a block diagram showing a detailed internal construction of the total control device 20.

The total control device 20 is generally divided into a command block 21 for integrally controlling the playback and synthetic karaoke apparatuses, a data file block 22 for stocking song data used in the synthetic karaoke, and an acoustic/graphic block 23 having various functions. First, the command block 21 is comprised of a receiver 21A, a panel interface 21B, a request controller 21C, an indicator 21D, a driver 21E, an I/O selector 21F and an access interface 21G. The receiver 21A receives a command from the remote controller 50. The panel interface 21B admits another command inputted from a switch panel 24 (FIG. 1) installed in the front face of the total control device 20. the request controller 21C operates in response to a command of song request from either of the receiver 21A and the panel interface 21B so as to organize a plurality of song requests to effect selection and/or reservation of the requested karaoke songs. The indicator 21D is driven by the driver 21E to indicate item codes of the selected or reserved songs. The I/O selector 21F selects inputs and outputs of the audio and video signals.

The data file block 22 is comprised of a file sorter 22A, a communication controller 22B and a data storage 22C. The file sorter 22A receives the selected or reserved item codes of the karaoke songs from the request controller 21C. The communication controller 22B communicates to the host station 30 through the ISDN network 40. The data storage 22C stocks the song data received from the host station through the ISDN network 40 to form a data file as an open data supply. In operation, when the file sorter 22A receives the select or reserve command from the request controller 21C, the file sorter 22A initially accesses the data storage 22C to search if the song data of the requested karaoke song is stored. If stored, the searched song data is read out. On the other hand, if not stored, the communication controller 22B is activated to admit a requested song data from a database of the host station 30. The data storage 22C is comprised of, for example, a hard disc driver (HDD) having a capacity of 100 MB (megabyte) such that the HDD can stock one thousand songs provided that each karaoke song is prescribed by 10 KB (kilobyte) of song data in arrange.

The acoustic/graphic block 23 is comprised of a data buffer 23A, a multimedia sequencer 23B, a tone generating processor 23C, a video processor 23D and a video superimposer 23E. The data buffer 23A temporarily holds the song data supplied from the file sorter 22A. The multimedia sequencer 23B synchronously controls various events including musical tones, pictures and additional effects according to event information contained in the song data. The tone generating processor 23C processes the song data to synthesize the musical tones of the karaoke song under the control by the sequencer 23B. The video processor 23D generates the background pictures, the characters of the song words and else. The video superimposer 23E superimposes the graphic outputs of the video processor 23D with another picture such as a background motion picture which is recorded in a background video LD (BGV-LD) loaded in the LD changer 11.

The I/O selector 21F of the command block 21 coordinates the audio part of the karaoke performance such as to select either of the playback audio output from the LD changer 11 and the synthesized audio output from the tone generating processor 23C to feed the mixing amplifier 13. Further, the I/O selector 21F coordinates the video part of the karaoke performance such as to select either of the video output reproduced from the LD changer 11 and the other video output generated from the video superimposer 23E to feed the monitor CRT 12. If the LD changer 11 is disconnected from the I/O selector 21F, the synthetic karaoke apparatus and the playback karaoke apparatus are functionally independent from each other. The synthetic and playback karaoke apparatuses are integrated with each other by means of the I/O selector 21F and the access interface 21G, which are provided in the total control device 20.

In the karaoke system as shown in FIGS. 1 and 2, the command block 21 operates in response to a song request from the remote controller 50 or else to initially check as to if the requested song is recorded in the closed and separated data source of the LD changer 11. Namely, the first priority is given to the playback karaoke apparatus 10 for efficient use of the audio and video source recorded in the LD changer 11. If the LD changer 11 stores the requested karaoke song, its audio an video outputs are utilized to effect the karaoke performance. On the other hand, if the requested karaoke song is not found in the LD changer 11, the command block 21 passes an item code of the requested karaoke song to the file sorter 22A so as to utilize song data of the synthetic karaoke apparatus. In such a case, the database of the host station 30 is not accessed immediately, but the internal data storage 22C is accessed precedingly to check to see if the requested song data is stocked. If stocked, the requested song data is retrieved from the data storage 22C for the musical tone synthesis. Namely, the second priority is given to the open data file of the data storage 22C. Further, if the requested song is not found in the data storage 22C, the host station 30 is called to transmit therefrom the requested song data through the ISDN network. Namely, the third priority is given to the original database of the host station. In case that the synthetic karaoke apparatus is not provided with the data storage 22C, the song data retrieval from the host station is given the second priority.

Figure 3:
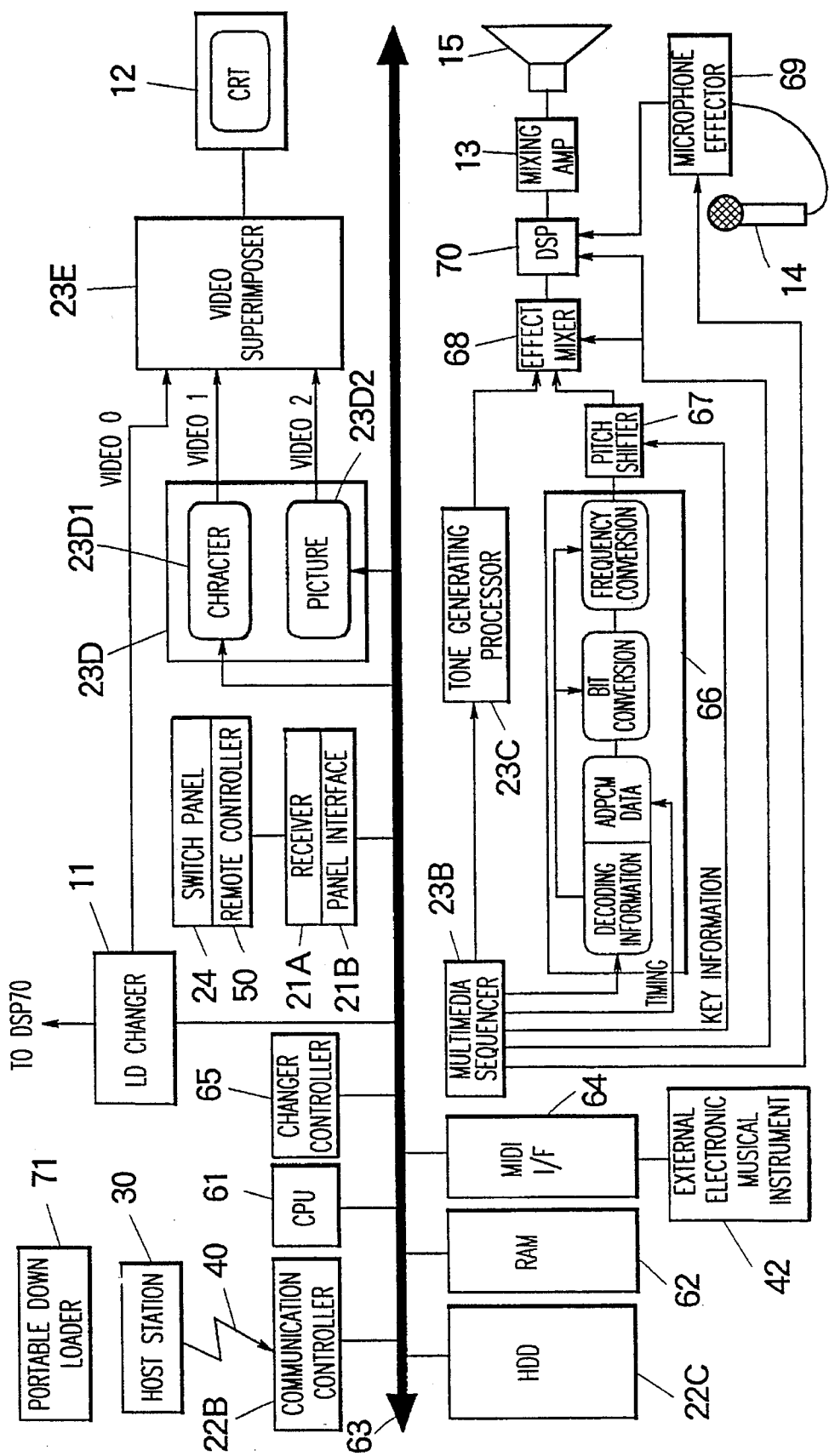
FIG. 3 is a detailed structural diagram of the FIG. 1 karaoke system.

FIG. 3 shows a detailed construction of the inventive karaoke system. The disclosed embodiment contains additional components not explicitly illustrated in FIGS. 1 and 2. For example, a central processing unit (CPU) 61 is provided to undertake overall control of the karaoke system according to a program ROM installed in the multimedia sequencer 23B. A random access memory (RAM) 62 provides a working area used when the CPU 61 undertakes the overall control of the karaoke system. A data and address bus line 63 connects the various components altogether to constitute the total karaoke system. A MIDI interface 64 is provided to connect to an external electronic musical instrument 42. A changer controller 65 controls the LD changer 11. The changer controller 65 can be selected according to a model type of the LD changer 11.

An ADPCM decoder 66 is provided to undertake bit-conversion and frequency-conversion to expand an adaptive delta pulse code modulation (ADPCM) data containing compressively coded waveforms fed from the multimedia sequencer 23B so as to reproduce an audio signal representative of a back chorus or else. A pitch shifter 67 is connected to the ADPCM decoder 66 for controlling the tone pitch of the decoded audio signal according to key information provided from the multimedia sequencer 23B. An effect mixer 68 receives the outputs of the pitch shifter 67 and the tone generating processor 23C. The tone generating processor 23C functions as a music synthesizer driven by a song data to synthesize an audio signal of the karaoke accompaniment. The tone generating processor 23C is comprised of a tone generating unit for synthesizing the musical tone based on a MIDI data or else and a controlling unit. A microphone effector 69 imparts an acoustic effect such as an echo, an excitement and else to an output of the microphone 14. A digital sound field processor (DSP) 70 is provided to impart a sound field effect to the output of the microphone effector 69 and the audio output of the LD changer 11.

On the other hand, the video processor 23D processes character information representative of words and else associated to the performed song, and background picture information representative of still and motion pictures so as to generate a video signal for display. In this embodiment, the video processor 23D is divided into two units 23D1 and 23D2. The one video processor unit 23D1 generates the song word characters to output a video signal VIDEO 1, and the other video processor unit 23D2 generates the background pictures to output the video signal VIDEO 2. The LD changer 11 is operated to reproduce the karaoke song recorded in the Laser Disc in the playback karaoke mode, or otherwise to reproduce image information alone for use in the synthetic karaoke mode. More particularly in the synthetic karaoke mode, the LD changer 11 is operated in synchronization with the karaoke accompaniment synthesized by the tone generating processor 23C to output a video signal VIDEO 0 representative of a still picture recorded in a given frame of a given Laser Disc, or representative of a motion picture which starts from a given frame. The video superimposer 23E superimposes these video signals VIDEO 0, VIDEO 1 and VIDEO 2 with each other to form a composite picture.

Further, a down loader 71 of the portable type is utilized to load a package of the song data into the storage (HDD) 22C without using the ISDN network 40. For example, when the karaoke system is installed at a given user spot, a supplier brings the portable down loader 71 to the user spot to load the package of song data at once. By such a volume loading, the user can save a long time communication with the host station 30 through the ISDN network 40, which would be needed for transfer of the great volume of the song data.

Hereinafter, detailed description will be given to significant aspects of the operation of the inventive karaoke system in conjunction with the drawings.

Playback/Synthesis control

When the remote controller 50 or the switch panel 24 is actuated to designate a karaoke song to be performed, the CPU 61 refers to an index table stored in the data storage 22C to check to see if the designated song is recorded in the LDs of the auto-changer 11 which is given the first priority. If recorded, the designated song is reproduced from the LD in the playback mode. The auto-changer 11 outputs the audio signal which is transmitted to the loudspeaker 15 through the DSP 70, and concurrently outputs the video signal VIDEO 0 which is transmitted to the monitor CRT 12 through a selector section of the video superimposer 23E. On the other hand, the live voice of the singer is converted by the microphone 14 into an electric signal which is fed to the DSP 70 through the microphone effector 64. The mixing amplifier 13 mixes the instrumental accompaniment part and the vocal part with each other so that the loudspeaker 15 produces the mixed audio output.

If the designated song is not recorded in the LD changer 11, the CPU 61 searches the song data stocked in the HDD storage 22C which is given the second priority. If the designated song is stocked in the data storage 22C, the song data is supplied to the RAM 62. The tone generating processor 23C operates according to the song data to synthesize the musical tones to effect the karaoke performance. Such a synthesis of the musical tone is carried out under the control by the multimedia sequencer 23B. With regard to the audio part, the tone generating processor 23C generates the audio signal according to the digital song data read out from the RAM 62. The audio signal is acoustically sounded by the loudspeaker 15 through the effect mixer 68, the DSP 70 and the mixing amplifier 13. With regard to the video part, the video processor units 23D1 and 23D2 produce the word characters and the background pictures according to graphic information contained in the song data under the control by the multimedia sequencer 23B in synchronization with progression of the song. The generated word characters and background pictures are visually displayed by the monitor CRT 12 through the video superimposer 23E.

Additionally, another background picture reproduced from the LD charger 11 may be also superposed to the background picture and the word characters by the video superimposer 23E. The word characters are variably displayed by the monitor CRT 12 such that a color of the displayed words is sequentially changed in synchronization with progression of the song so as to teach the player vocal timings. Accordingly, the player can sing a song while handling the microphone 14 and following the word characters displayed on the monitor CRT 12.

If the designated song data is not stored in the HDD storage 22C, the CPU 61 activates the communication controller 22B to take the designated song data from a primary supply of the host station 30 on line, which is given the third priority. Namely, the host station 30 is called through the ISDN network 40. When the host station 30 responds to the calling, the song item code is sent to request the designated song data. The taken song data is stocked in a secondary supply of the HDD storage 22C for re-use.

Data transfer from the host station

Figure 4:
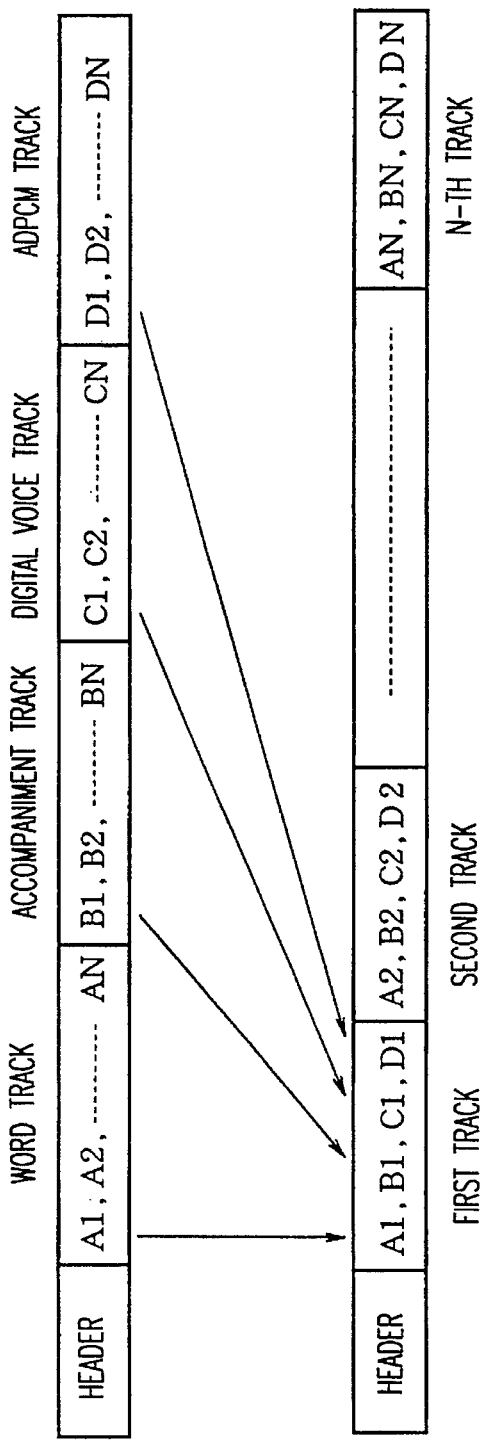
FIGS. 4(a) and 4(b) are a schematic diagram showing a song data format adopted in the inventive karaoke system.

The synthetic karaoke apparatus is driven by the song data which has a data format generally shown in FIG. 4(a). The song data is comprised of a header and a subsequent serial train of a word track, an accompaniment track, a digital voice track an so on. Each track has a similar alternate arrangement of a duration and an event. The song data is transferred from the host station conventionally in the serial format so that the transfer of the song data is completed when the last track is received. Therefore, the karaoke performance is started after the last track is received by the karaoke system. The player must wait for a considerable time interval after the request to actually start the karaoke performance. For example, the typical song data has a length of 15 KB–20 KB for the header and 100 KB from the word track to the voice track. Such a length of the song data is transferred by about 15 seconds through the fast ISDN network having a data transfer rate of 8 KB per second. Actually, this net transfer time is added by overheads such as a calling time of the host station, a database access time in the host station and else so that the total transfer time reaches more or less 20 seconds. This waiting time is ten or more times as long as the retrieval time of the song data from the HDD, which is in the order of 1–2 seconds.

In view of this, the data transfer format is arranged as shown in FIG. 4(b) in the inventive karaoke system. Namely, in the original song data format shown in FIG. 4(a), the word track is divided into time-sequential sections of A1, A2, . . . , AN, the accompaniment track is likewise divided into time-sequential sections of B1, B2, . . . , BN, and the digital voice track is likewise divided into time-sequential sections of C1, C2, . . . , CN. Then, as shown in the FIG. 4(b) format, the first sections A1, B1 and C1 are collected from the respective tracks to compose a first track. Similarly, the second sections A2, B2 and C2 are collected to form a second track. In similar manner, the N-th sections AN, BN and CN are collected to form an N-th track. For example, in case of N=6, the data transfer of the first track having the length of about 15 KB is completed by about 2 seconds. The preceding data transfer of the header requires about 2 seconds, hence only 4 seconds are spent to receive the first track. Even if an overhead is added, the receipt of the first track may be finished by about 8 seconds. Upon receipt of the first composite track, the karaoke system obtains a top part of all the performance information including the song word data, the accompaniment data, the digital voice data and else to thereby readily start the top part of the karaoke performance accompanied by the word display and else. In estimation, the song data representative of a music piece of 3 minutes length is divided into the first track through the sixth track such that the karaoke system can commence about 30 seconds of the karaoke performance according to the first track of the song data. Accordingly, the karaoke system commences the karaoke performance after the first track is received, while the second and further tracks are continuously entered. After the performance of the first track is finished, the second track is performed while the remaining tracks are continuously entered. By such a manner of flying start, the karaoke system immediately initiates the karaoke performance to finish the same without interruption, while the song data is transferred in parallel to the song performance.

Data of the song word track, the accompaniment track and the digital voice track have a relatively small data volume like the MIDI data. Occasionally, the song data may be followed by a relatively great volume of waveform data representative of, for example, a back chorus. In such a case, data compression technology such as high efficiency coding is adopted to reduce the data volume. In the FIG. 4(a) format, the song data is followed by the last additional track which carries an Adaptive Delta Pulse Code Modulation (ADPCM) data. The ADPCM data is compressed in the four-bit form by the re-sampling rate of 11 KHz or 22 KHz relative to the original waveform data having the sixteen-bit form sampled by the rate of 44 KHz. Even though compressed, the ADPCM track may have a data length up to several hundreds KB, which needs a quite long transfer time. In view of this, as shown in the FIG. 4(b) transfer format, the ADPCM track is also divided into time-sequential sections of D1, D2, . . . , DN, and the respective sections are distributed separately to the first, second, . . . , N-th tracks for the quick data transfer. By such a manner, the karaoke song accompanied by the back chorus can be promptly initiated in the flying start mode.

Multimedia sequencer

The multimedia sequencer 23B is basically composed of an MIDI sequencer and is provided with an operating system (OS) function to concurrently execute parallel tasks. Consequently, the multimedia sequencer 23B can execute in real time basis a multiple of events of plural tracks contained in one song data in synchronization with each other under the software control. The "event" covers a wide variety of representations involved in the karaoke performance, including instrumental accompaniment, back chorus, song word display, background picture, sound effect, external instrument control and so on. The multimedia sequencer 23B receives the song data which is supplied from the working RAM 62 by means of the CPU 61.

As shown in FIG. 4(a), the song data is composed of the word track, the accompaniment track in the form of an MIDI track, the voice track, and the additional ADPCM track. The multimedia sequencer 23B supplies accompaniment information from the MIDI track to the tone generating processor 23C to synthesize the instrumental accompaniment automatically. Further, the sequencer 23B supplies a compressively coded waveform data in the form of the ADPCM data to the ADPCM decoder 66 where the compressed ADPCM data is expanded and decoded to reproduce an audio signal effective to sound a back chorus or else. Moreover, the sequencer 23B controls the ADPCM decoder 66 according to decoding information contained in the header or the voice track of the song data so as to regulate decoding of the ADPCM data.

Figure 5:
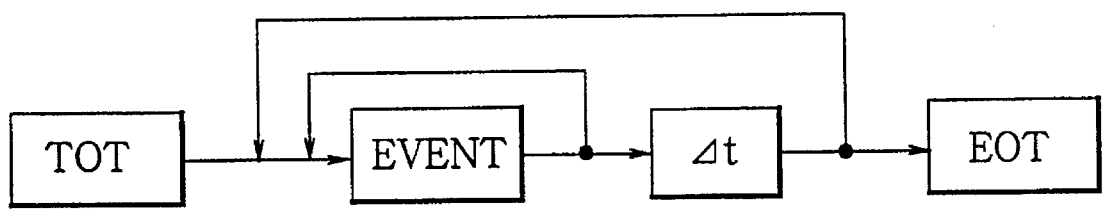
FIG. 5 is an illustrative diagram showing a routine of executing MIDI events.

Referring to FIG. 5, the regular MIDI track is comprised of an alternate arrangement of an event and a duration (waiting interval) Δt, which starts from the top of track (TOT) and terminates by the end of track (EOT). The sequencer 23B sequentially processes each event in repetitive manner as indicated by the arrows of FIG. 5.

Figure 6:
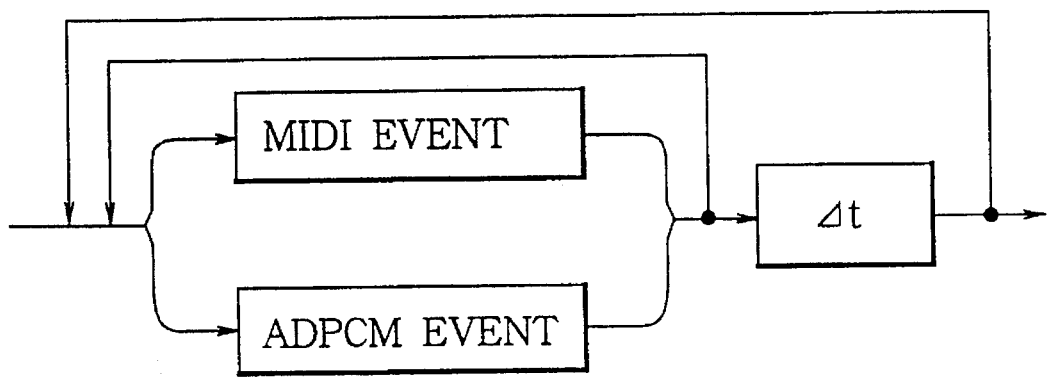
FIG. 6 is an illustrative diagram showing a routine of executing ADPCM events concurrently with the MIDI events.

On the other hand, in case that the song data is added with the ADPCM data shown in FIG. 4(a), the ADPCM event is executed in parallel to the execution of the MIDI event as illustrated by FIG. 6. The ADPCM event is prescribed, for example, in the digital voice track, hence the timing of executing the ADPCM event can be synchronized with the MIDI event which is prescribed in the accompaniment track under the software control. Each ADPCM event contains various items such as (1) designation of ADPCM sound, (2) inactive status of pitch shift, (3) tone volume, and (4) key information.

On the other hand, the ADPCM data typically represents musical tone waveforms such as a back chorus voice waveform involved in the karaoke performance. Although compressed, the ADPCM data has a data volume far greater than that of the MIDI data. However, as long as the back chorus is concerned, a typical chorus sound may be repeatedly added in a karaoke song. In view of this, typical chorus sounds are provisionally prepared as a set of the ADPCM data. During the course of reproduction, one of the provisionally prepared ADPCM data is selected to synthesize the back chorus involved in the requested song. Such a technique can save the total volume of data transferred from the host station and can reduce the memory capacity. The "designation of ADPCM sound" involved in the ADPCM event is utilized to select a desired one of the ADPCM waveforms.

The ADPCM data may be reproduced in a pitch-shifted form. For this purpose, the "key information" is involved in the ADPCM event so as to designate a desired degree of the pitch shift. The pitch shifter 67 shown in FIG. 3 carries out the pitch shift of the ADPCM sound. The pitch shifter 67 may be composed of a digital signal processor called a "karaoke processor (KP)". The pitch shifter 67 can conduct not only modulation in which the song is temporarily pitch-shifted, but also transposition in which the song is entirely transposed by the user's command. In such a case, the pitch shift may be superposed further to the transposed form of the song.

The ADPCM data may be used to represent a waveform of effect sounds besides the back chorus sounds. In such a case, the "inactive status of pitch shift" involved in the ADPCM event is set to avoid unnatural pitch shift of the effect sound. The inactive status is effective to inhibit the pitch shift of the ADPCM sound even if the user commands the transposition. Lastly, the "tone volume" is set to automatically control the volume of the ADPCM sound each event.

Common back chorus/Phrase back chorus

The back chorus is classified into a general or common back chorus and a specific or phrase back chorus. The common back chorus is composed of a rather simple sound like a combination of a short consonant and a prolonged vowel such as "WAAA-" and "RAAA--" which may be repeatedly added in the same song, or a train of simple voices such as "WAAWAAWAA--" or "WA, WA, WA,-" which may be used for different songs. On the other hand, the phrase back chorus is composed of a particular phrase such as "NAGASAKIWAAA" specific to a particular song. The synthetic karaoke apparatus can treat the common back chorus composed of simple sounds as a kind of musical tones likewise the instrumental accompaniment tones so as to synthetically generate the chorus sounds by the tone generating processor. Such a treatment can save the total data volume of the back chorus to thereby shorten the data communication time as well as to reduce the data memory capacity.

Figure 7:
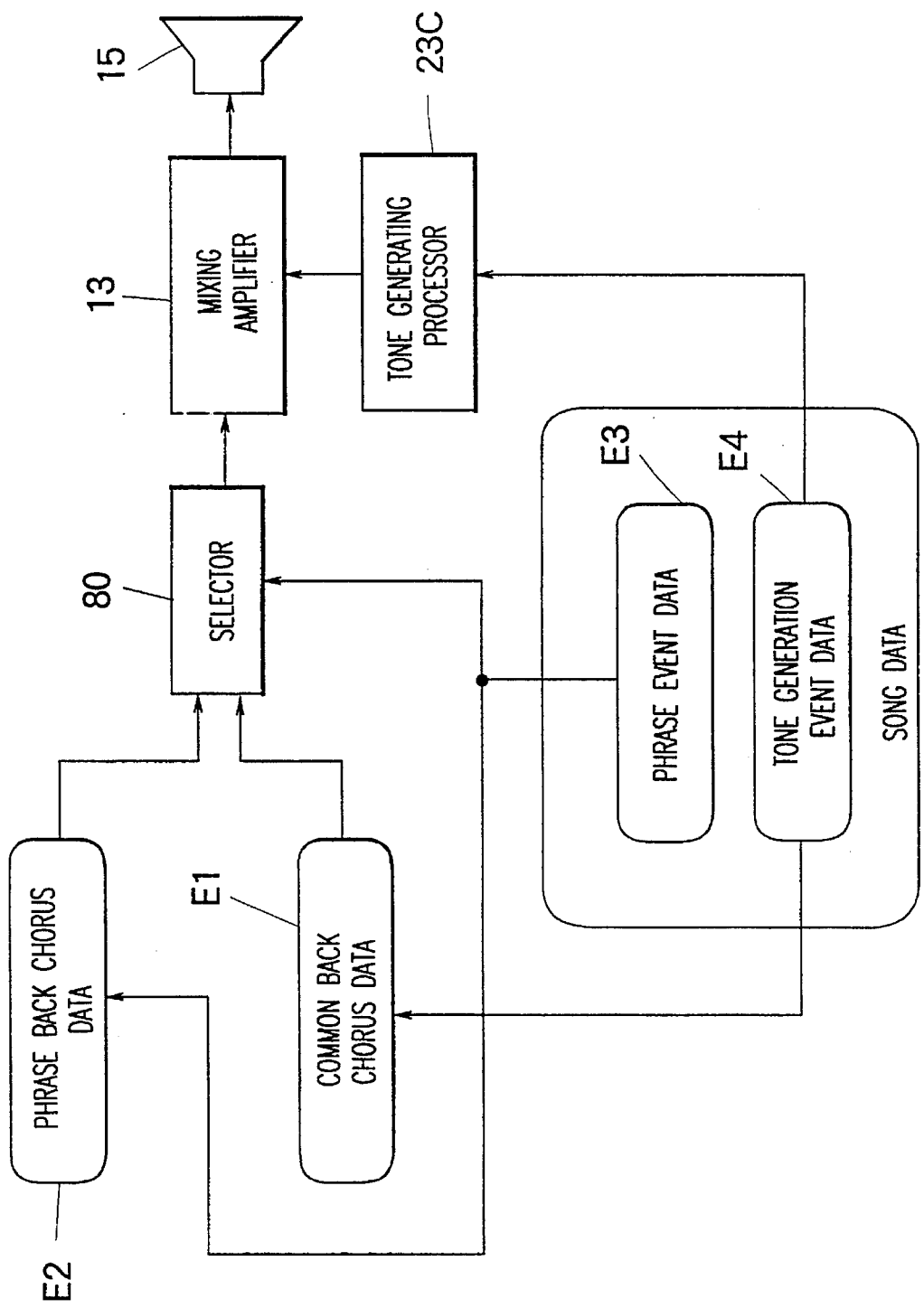
FIG. 7 is an operational block diagram showing a process of synthesizing a common back chorus by a tone generating processor.

Referring to FIG. 7, detailed description will be given for selective process of the common back chorus/phrase back chorus. With regard to the common back chorus data E1, typical voice waveforms such as "WAAA," "RAAA" and "AAA" are provisionally sampled, and the sampled waveform data is memorized in a library of the tone generating processor 23C. With regard to the phrase back chorus data E2, a waveform data representative of a specific vocal waveform such as "NAGASAKI-" is supplied in the form of ADPCM data or else from the HDD storage 22C or else for each song. Upon request, the phrase back chorus data E2 is transferred to the RAM 62 (FIG. 3) together with the song data. The phrase back chorus data E2 is processed by means of the ADPCM decoder 66 based on a phrase event data E3 contained in the digital voice track of the song data (FIG. 4(a)). On the other hand, the common back chorus data E1 is processed by means of the tone generating processor 23C (FIG. 3) according to a tone generation event data E4 contained as additional information in the MIDI track of the song data. Either or occasionally both of the common back chorus data E1 and the phrase back chorus data E2 is selected by a selector 80 which may have OR logic function. The selected one of the common and phrase back chorus data E1, E2 is mixed with other musical tone data fed from the tone generating processor 23C by the mixing amplifier 13, and is then sounded by the loudspeaker 15. As described above, the phrase back chorus is supplied in the form of compressively coded ADPCM data which is then decoded by the ADPCM decoder, while the common back chorus is supplied in the form of MIDI data which is processed by the tone generating processor.

Compression and Expansion of back chorus data

The back chorus has generally a great data volume. In view of this, the host station 30 compresses the original back chorus data, while the karaoke system expands the compressed back chorus data. The data compression is carried out by ADPCM in this embodiment. In such a case, the ADPCM decoder 66 expands and decodes the compressively coded back chorus data in the karaoke system. Generally, the back chorus may contain the common back chorus and the phrase back chorus as mentioned foregoing. In this embodiment, the phrase back chorus data is subjected to the ADPCM, while the common back chorus data is separately processed in the tone generating processor. Alternatively, the common back chorus data may be also subjected to the ADPCM.

In the host station, the compressive data encoding is applied to a digitally sampled phrase back chorus data. In such a case, the original waveform data is re-sampled to carry out frequency compression. The re-sampling rate is written into the header of the song data as decoding information. Bit compression of the original digital data is also carried out by the ADPCM technique or else, and its bit trimming rate is likewise written into the header as decoding information. For example, the regular digital data of 16 bits recorded in the Compact Disc has a sampling rate of 44.1 KHz, and this regular digital data is compressed into the ADPCM data of 4 bits re-sampled at 22.05 KHz or 11.025 KHz.

Figure 8:
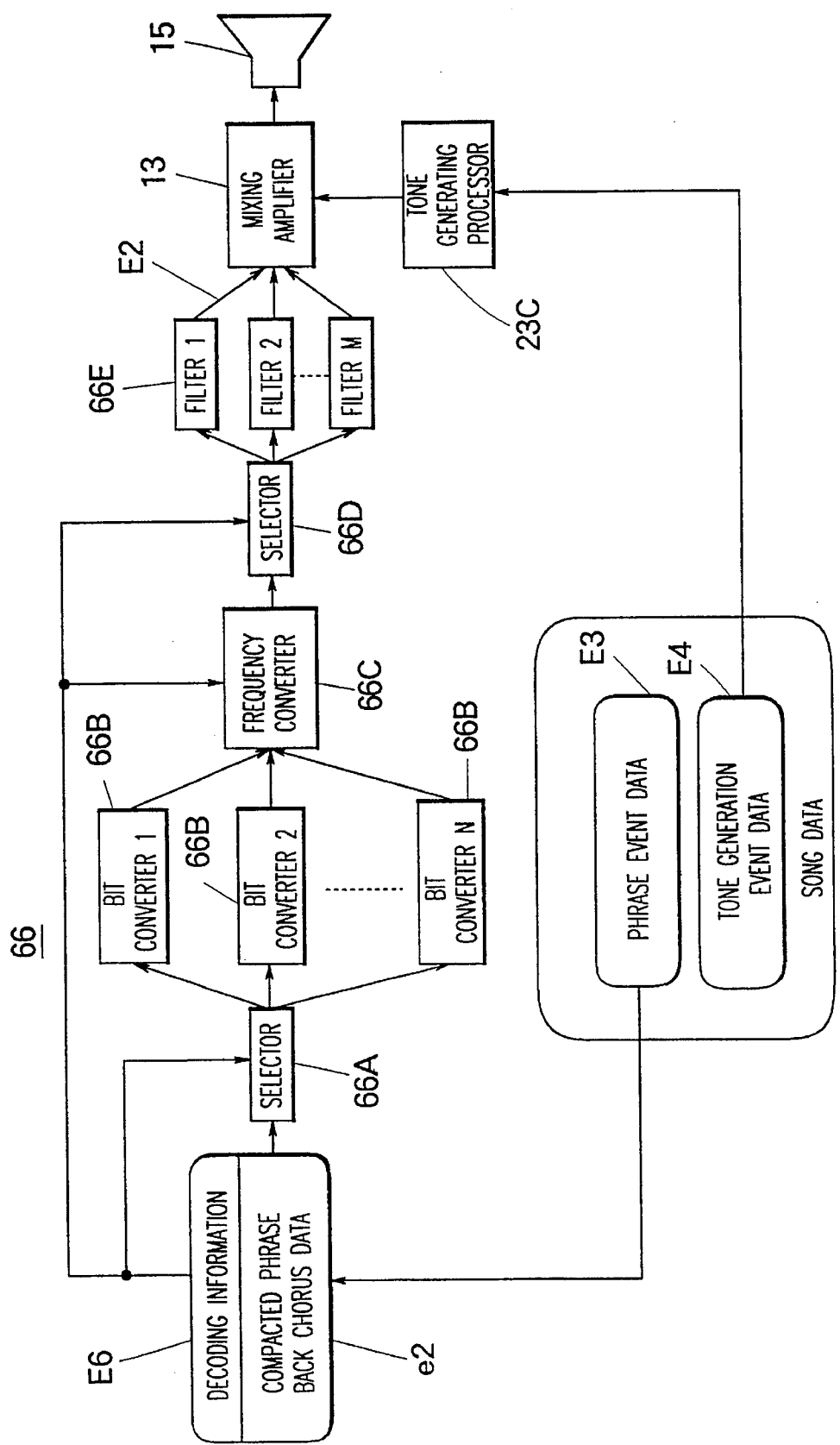
FIG. 8 is an operational block diagram showing a process of decoding a phrase back chorus data.

Referring to FIG. 8, in the inventive karaoke system, the ADPCM decoder 66 expands the compressively coded ADPCM data e2 of the phrase chorus according to the decoding information E6 which indicates the encoding condition or compression condition such as the re-sampling rate and bit trimming rate. Namely, one of bit converters 66B is selected by means of a selector 66A, and a frequency converter 66C is set with a suitable conversion frequency according to the decoding information E6. Expanded or decoded phrase chorus data E2 by such a manner passes through one of filters 66E selected by another selector 66D, and is mixed by the mixing amplifier 13 with another audio signal processed by the tone generating processor 23C. This data compression technology can efficiently save the data volume to be transferred on line, and can reduce a memory capacity of the HDD storage 22C. As described before, the decoding information is written in the header of the song data shown in FIG. 4(a). A back chorus data of different songs may be differently compressed according to contents and a length thereof to individually optimize the encoding condition. Alternatively, the decoding information E6 may be variably set for individual phrases. In such a case, various ones of the decoding information is distributed to the digital voice track. The digital voice track is divided into plural sections corresponding to the individual phrases. Each section is provided with a sub-header where the decoding information is prescribed. The data encoding condition can be varied for different phrases within the same song, while the variable data encoding condition is written into the corresponding section of the digital voice track as the decoding information. For example, a significant or attractive parts of the back chorus data can be moderately compressed by a higher re-sampling rate with a greater bit number as compared to the remaining parts. In variation, the data encoding condition is set variably in relation to a tone volume of the respective phrases of the back chorus. The present embodiment adopts ADPCM for the data compression of the waveform data. However, the invention may adopt other kinds of the high efficiency codic technology such as DPCM (Differential Pulse Code Modulation), ADM (Adaptive Delta Modulation), APC (Adaptive Predictive Coding), ATC (Adaptive Transform Coding), MPC (Multi-Pulse Excited Coding), CV (Channel Vocoder), LPC (Linear Predictive Coding) and LSP (Linear Spectrum Pair Coding).

Tone pitch control

Figure 9:
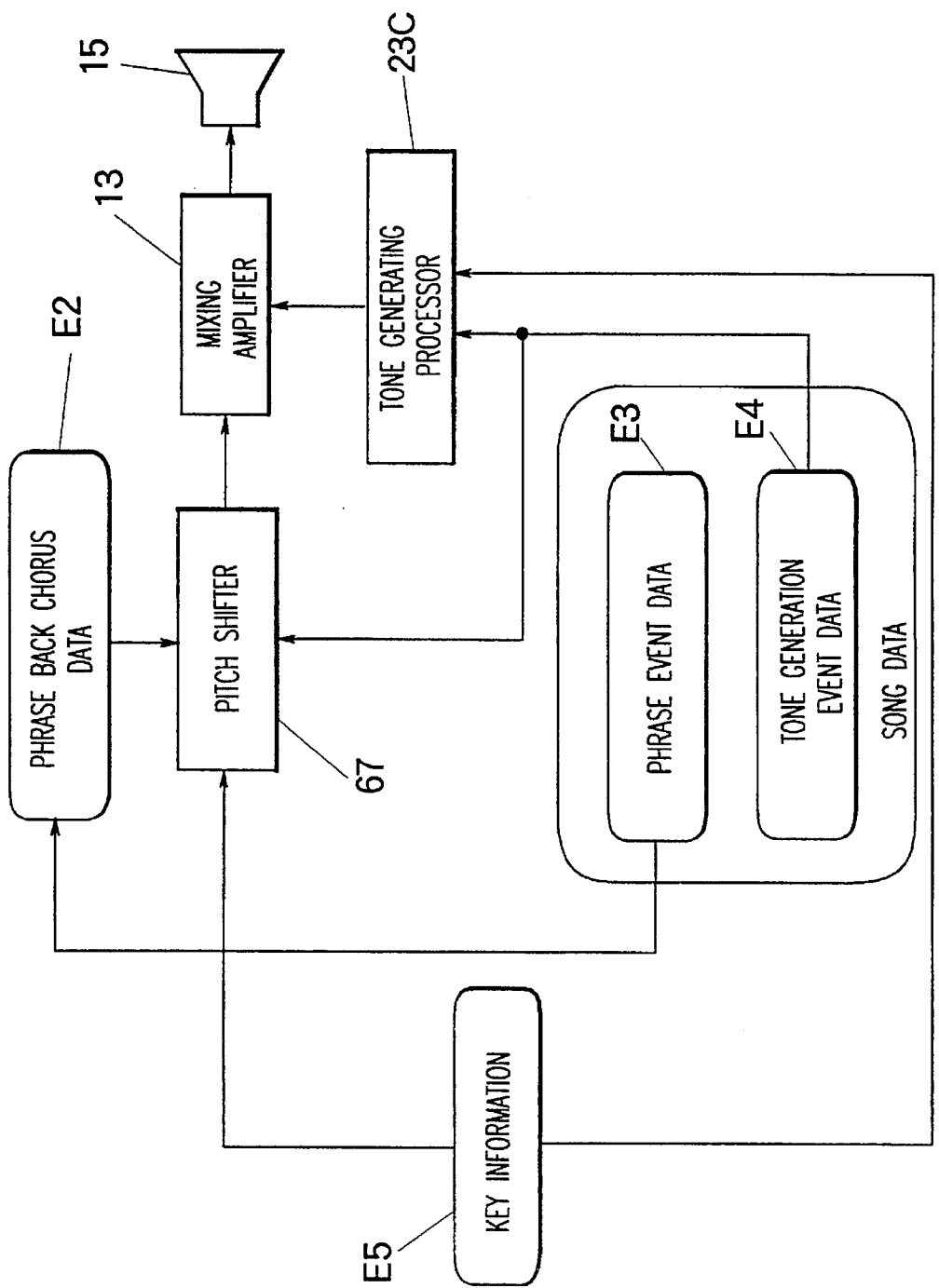
FIG. 9 is an operational block diagram showing a process of pitch shift of the back chorus.

In the FIG. 3 construction, the pitch shifter 67 receives the audio signal output of the ADPCM decoder 66 to carry out tone pitch regulation or the pitch shift according to given key information. The pitch shift includes modulation by which the key is temporarily changed in the middle of the song, and transposition by which the key of the song is totally pitch-shifted. Referring to FIG. 9, one example is given for operation of the pitch shifter 67, where one phrase back chorus data E2 is repeatedly reproduced while being pitch-shifted during the course of the instrumental accompaniment. For example, a specific phrase "NAGASAKIII" is repeatedly sounded while its key is successively raised to form the back chorus. As shown in FIG. 9, key information E5 is fed to the pitch shifter 67 and to the tone generating processor 23C. The pitch shifter 67 pitch-shifts the phrase back chorus data E2 according to the inputted key information E5. The phrase chorus data E2 is fed to the pitch shifter 67 according to the phrase event data E3. On the other hand, the pitch shift of the regular accompaniment tones is controlled by the tone generating processor 23C. Further, when modulation occurs in the song, the key information indicative of modulation is fed to the pitch shifter 67 from the sequencer 23B so as to concurrently change the key of the back chorus. By such a manner, the same phrase back chorus data can be commonly used for the back chorus of a different key. Alternatively, key information indicative of transposition is externally inputted so as to transpose the back chorus concurrently with the instrumental accompaniment.

Inhibition of pitch shift for effect sound

The pitch shifter 67 may receive an effect sound besides the back chorus. The pitch shift of the effect sound may seriously hinder an expected effect to thereby adversely cause incompatibility. In view of this, the before-mentioned inactive status is set for the effect sound to inhibit the pitch shift thereof to maintain the original tone pitch even though the key information E5 is inputted.

Compensation for delay of chorus data

Upon issue of a sound production command, the back chorus data passes through the ADPCM decoder 66 and the pitch shifter 67 before reaching the effect mixer 68 (FIG. 3) to thereby cause a certain delay. For example, the pitch shifter 67 may structurally adds a process delay in the order of 30 ms±30 ms. In view of this, compensation for the delay is required in order to output the back chorus sound concurrently with the accompaniment sound outputted from the MIDI tone generating processor in real time basis. For this, the time sequential event data of the back chorus is written into the voice track or chorus sound track precedingly by about 30 ms to corresponding MIDI event data written in the MIDI track. The sequencer 23B (FIG. 3) feeds the chorus event data to the ADPCM processor 66 precedingly to the MIDI event data to thereby cancel out the delay between the back chorus sound and the MIDI accompaniment sound.

As described above, according to the first aspect of the invention, the back chorus is supplied in a variably compressed waveform data together with the decoding information indicative of the variable encoding or compressing condition. The compression condition can be optimized according to significancy of individual back choruses to achieve efficient data compression to thereby save the data transfer time and volume and the data memory capacity. According to the second aspect of the invention, an original standard back chorus is internally modulated by pitch shift to provide back chorus versions of different keys to thereby save the original data volume of the karaoke song. According to the third aspect of the invention, the common back chorus having simple sounds is synthesized by the tone generator according to concise data to thereby save the total data volume of the karaoke song.

What is claimed is:

1. A karaoke apparatus for sounding a requested karaoke song containing an instrumental accompaniment and a back chorus, the karaoke apparatus comprising:

a supply circuit that supplies waveform data representative of a back chorus and being compressed by a desired compression method, and that supplies song data containing accompaniment information prescriptive of an instrumental accompaniment and decompression information of the desired compression method of the waveform data;

a generating circuit that processes the accompaniment information to generate a first audio signal effective to sound the instrumental accompaniment; and a reproducing circuit operative in synchronization with the generating circuit to decompress the compressed waveform data according to the decompression information in the song data for reproducing a second audio signal effective to sound the back chorus concurrently with the instrumental accompaniment.

2. A karaoke apparatus according to claim 1, wherein the supply circuit includes means for supplying a plurality of waveform data corresponding to different karaoke songs, and being compressed by different compression methods according to contents of the respective karaoke songs.

3. A karaoke apparatus according to claim 1, wherein the supply circuit includes means for supplying a waveform data representative of a back chorus containing a plurality of phrases, the waveform data being compressed by a variable compression method for the respective phrases.

4. A karaoke apparatus according to claim 1, wherein the supply circuit includes means for supplying a waveform data being compressed by a variable compression method in relation to a significant portion of the back chorus.

5. A karaoke apparatus according to claim 1, wherein the supply circuit includes means for supplying a waveform data being compressed by a variable compression method in relation to a tone volume of the back chorus.

6. A karaoke apparatus according to claim 1, wherein the supply circuit includes:

means for supplying key information which determines a pitch shift of the karaoke song; and a shifter circuit connected to the reproducing circuit that processes the second audio signal according to the key information to thereby carry out the pitch shift of the back chorus.

7. A karaoke apparatus according to claim 1, wherein the supply circuit includes means for supplying a song data containing additional information prescriptive of a common back chorus, and for supplying the waveform data representative of a phrase back chorus, an wherein the generating circuit includes means for processing the additional information concurrently with the accompaniment information so as to sound the common back chorus and the instrumental accompaniment, while the reproducing circuit operates so as to sound the phase back chorus which is mixed to the instrumental accompaniment.

8. A karaoke apparatus for sounding a requested karaoke song containing an instrumental accompaniment and a back chorus, the karaoke apparatus comprising:

a supply circuit that supplies song data containing accompaniment information prescriptive of an instrumental accompaniment, waveform data digitally sampled to represent a back chorus, and programmed key information which determines a pitch shift of the karaoke song;

a generating circuit that processes the accompaniment information to generate a first audio signal effective to sound the instrumental accompaniment;

a reproducing circuit operative in synchronization with the generating circuit for processing the waveform data to reproduce a second audio signal effective to sound the back chorus concurrently with the instrumental accompaniment; and a shifter circuit that processes the second audio signal according to the key information to thereby carry out the pitch shift of the back chorus, wherein the supply circuit includes means for supplying the programmed key information indicative of a modulation of a phrase contained in the back chorus during the course of the instrumental accompaniment so that the shifter circuit carries out a modulational pitch shift of the phrase.

9. A karaoke apparatus according to claim 8, wherein the supply circuit includes means for externally supplying the key information indicative of a transposition of the karaoke song so that the shifter circuit carries out a transpositional pitch shift of the back chorus, while the generating circuit concurrently transposes the instrumental accompaniment according to the key information.

10. A karaoke apparatus for sounding a requested karaoke song containing an instrumental accompaniment and a back chorus, the karaoke apparatus comprising:

a supply circuit that supplies song data containing accompaniment information prescriptive of an instrumental accompaniment, additional information prescriptive of a common back chorus, and waveform data representative of a phrase back chorus;

a generating circuit that synthesizes an audio signal representative of the instrumental accompaniment and the common back chorus in accordance with the song data supplied by the supply circuit; and a reproducing circuit operative in synchronization with the generating circuit for processing the waveform data to reproduce another audio signal effective to sound the phrase back chorus which is mixed with the instrumental accompaniment.

11. A karaoke apparatus according to claim 10, further including a selector circuit connected to the generating circuit and the reproducing circuit, and being operable for selecting either of the common back chorus and the phrase back chorus.

* * * * *